United States Patent
Alexander et al.

(10) Patent No.: US 10,556,556 B2
(45) Date of Patent: Feb. 11, 2020

(54) DEPLOYABLE TEXTILE STRUCTURES WITH MULTIPLE-STABLE-STATE CHARACTERISTICS

(71) Applicant: GM GLOBAL TECHNOLOGY OPERATIONS LLC, Detroit, MI (US)

(72) Inventors: Paul W. Alexander, Ypsilanti, MI (US); Nancy L. Johnson, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 139 days.

(21) Appl. No.: 15/854,237

(22) Filed: Dec. 26, 2017

(65) Prior Publication Data

US 2019/0193650 A1     Jun. 27, 2019

(51) Int. Cl.
*B60R 13/02*        (2006.01)
*B44C 5/04*        (2006.01)

(52) U.S. Cl.
CPC ............... *B60R 13/02* (2013.01); *B44C 5/04* (2013.01); *B60R 2013/0287* (2013.01)

(58) Field of Classification Search
CPC .... B60R 13/02; B60R 2013/0287; B44C 5/04
See application file for complete search history.

(56) References Cited

U.S. PATENT DOCUMENTS

| | | | |
|---|---|---|---|
| 5,021,281 A | 6/1991 | Bompard et al. | |
| 5,858,159 A | 1/1999 | Holbrook et al. | |
| 6,350,709 B1 | 2/2002 | Veiga | |
| 6,808,587 B2 | 10/2004 | Bohm et al. | |
| 2010/0129575 A1 | 5/2010 | Veiga | |
| 2011/0062134 A1 | 3/2011 | Lochtman et al. | |
| 2012/0280479 A1 | 11/2012 | Barth et al. | |
| 2016/0303799 A1 | 10/2016 | Pettey et al. | |

*Primary Examiner* — Brian Handville
(74) *Attorney, Agent, or Firm* — Quinn IP Law

(57) ABSTRACT

Presented are deployable structures having multi-stable-state characteristics using skeletal architectures mounted onto textile backings, methods for making/using such structures, and vehicle components having bistable characteristics provided by polymeric exoskeletons printed onto textile substrates. A multi-stable-state deployable structure includes an elastic substrate fabricated from a (knitted) textile sheet, and an articulating (polymeric) framework mounted on the knitted textile sheet. The articulating framework and textile sheet structurally cooperate to transition from a first stable state, in which the deployable structure maintains a substantially planar shape, to a second stable state, in which the deployable structure maintains a first multidimensional topography, and from the second state to a third stable state, in which the deployable structure maintains a second multidimensional topography distinct from the first multidimensional topography. The articulating framework may include an elongated spine sandwiched between first and second sets of ribs, and a frame circumscribing the spine and ribs.

20 Claims, 3 Drawing Sheets

DEPLOYABLE TEXTILE STRUCTURES WITH MULTIPLE-STABLE-STATE CHARACTERISTICS

INTRODUCTION

The present disclosure relates generally to mechanical structures that have multiple stable states. More specifically, aspects of this disclosure relate to automotive components with a deployable element having bistable or tristable characteristics.

Current production motor vehicles, such as the modern-day automobile, are originally equipped with various assemblies and components composed of elements that are manufactured from textile materials, elements that are manufactured from polymeric materials, and elements that are manufactured from metallic materials. A vehicle seat assembly, for example, is composed of a generally upright seatback and a generally horizontal seat bottom, both of which are functionally supported on a seat platform that mounts to the vehicle body. Standard seatback and seat bottom sections include a rigid metallic or polymeric frame with an optional spring-based suspension, an expandable foam cushion that is supported on the frame, and a leather or textile trim material covering the frame and cushion. Other vehicle components and assemblies that may be fabricated with textile features include, but are not limited to, interior trim panels, floor panels and mats, knee bolsters, roof reinforcement panels, center stack consoles, center tunnel armrest consoles, instrument panel (IP) fascia, rear deck covers, etc.

Some vehicle components, such as the aforementioned trim panels, IP fascia, roof panels, and deck covers, etc., may be fabricated as multilayer laminate structures formed from a variety of joined material layers. An individual material layer may be selected to provide wear-resistance, flexibility, compressibility, rigidity, or aesthetic functionality. Vehicle trim panels, which define many of the interior surfaces inside an automobile's passenger compartment, generally include a rigid polymeric substrate that attaches to a door assembly frame, roof rail, or dashboard foundation. A flexible textile "skin" is adhere to the substrate to provide an aesthetically attractive appearance and a tactilely pleasing contact surface. While many of these individual layers are formed as a substantially flat blank prior to assembly, the resultant product often requires a multi-dimensional shape. However, any increase in packaging volume for a component has a concomitant increase in packaging and shipping costs associated with that component.

SUMMARY

Disclosed herein are deployable structures with multiple stable states using a brace framework mounted onto a textile backing, methods for making and methods for using such deployable structures, and motor vehicles with a vehicle component having bistable characteristics provided by a polymeric exoskeleton printed onto a knitted textile substrate. By way of example, there is presented a textile knitted structure (referred to colloquially as a "knit") with added reinforcement features for multi-stable-state functionality. Additive manufacturing—more commonly identified as "3D printing"—may be used to print 'skeletal' details onto one or more surfaces of a knitted support substrate. Optionally, a compliant skeletal framework may be laminated or adhered onto a pre-strained textile substrate to provide articulating features and selective deployability (e.g., using suitable origami or kirigami practices). A component fabricated in this manner may produce a multi-stable-state structure that is substantially or completely planar (flat and thin) in at least one stable state, providing low packaging volume for shipping and distribution. When ready for assembly, the component may selectively expand to another stable state to provide a predetermined space-filling volume (e.g., a deployed state for structural use) to simplify installation and assembly.

For any of the disclosed systems, methods and devices, the articulating framework may include a network of relatively rigid features or members. These relatively rigid features or members may be interconnected by more compliant elements or flexures which act as joints. Similarly, the textile may be knitted or woven in a manner such that it possesses local features that serve the same function. The elastic textile-based substrate may be locally and non-uniformly pre-tensioned prior to the mounting of the relatively rigid framework of joints to pre-load select sections or all of the structure. The framework may be further specified so the dimensions and stiffness of those members, features within the knit, and elasticity of the attached substrate dictate the structure's available paths of motion when coming to initial equilibrium after release from tooling, as well as the available modes of deformation or paths of motion when externally loaded. Those parameters may be specified such that the available paths of motion have states where their internal energy is relatively low/locally minimized, and it becomes stable. The structure may be designed to exhibit a plurality of these stable states across all or some of its available paths of motion.

Aspects of this disclosure are directed to components and assemblies formed, in whole or in part, from a deployable structure having multiple-stable-state characteristics. For instance, a multi-stable-state deployable structure is presented that includes a compliant, elastic substrate fabricated with a textile (knitted) sheet, and an articulating (polymeric) framework mounted on the textile sheet. The articulating framework and the textile sheet are cooperatively configured to transition between: a first stable (or semi-stable) state, in which the deployable structure maintains a substantially planar shape; a second stable state, in which the deployable structure maintains a first multidimensional topography; and, a third stable state, in which the deployable structure maintains a second multidimensional topography, distinct from the first multidimensional topography. The first multidimensional topography may be characterized by a first transverse cross-sectional geometry, while the second multidimensional topography may be characterized by a second transverse cross-sectional geometry that is distinct from the first transverse cross-sectional geometry.

For any of the herein described aspects and features, the articulating framework may include an elongated spine that is sandwiched between a first rib or set of ribs and a second rib or set of ribs. Each of the first ribs may project from a first lateral side of the elongated spine at a first oblique angle, while each second rib may project from a second lateral side of the elongated spine at a second oblique angle. The first oblique angle may be approximately equal to or, alternatively, may be distinct from the second oblique angle. The first plurality of ribs may be physically attached to the elongated spine by a first set or sets of living hinges, whereas the second plurality of ribs may be physically attached to the elongated spine by a second set or sets of living hinges.

For any of the herein described aspects and features, the first and second pluralities of ribs may be spaced from the elongated spine when the deployable structure is in the first stable state and, conversely, may abut the elongated spine when the deployable structure is in the third stable state. The spine may include first and second sets of grooves configured to receive therein rib ends of the first and second pluralities of ribs, respectively, when the deployable structure is in the third stable state. The spine may be configured to transition along an arcuate path when the deployable structure transitions between the first and second stable states; the spine may be configured to transition along a linear path when the deployable structure transitions between the second and third stable states. For at least some embodiments, adjacent segments of the elastic substrate may be folded over onto each other when the deployable structure is in the first stable state; these adjacent segments may be configured to unfold when the deployable structure transitions to the second and/or third stable states.

For any of the herein described aspects and features, the articulating framework may include a generally rigid frame that partially or completely surrounds the spine and ribs. For instance, the textile sheet of the elastic substrate includes an outer perimeter; the frame may extend continuously along the outer perimeter of the textile sheet, circumscribing the elongated spine and the ribs. The ribs may be spaced from the frame when the deployable structure is in the first stable state and, conversely, may abut the frame when the deployable structure is in the third stable state. The frame may include notches that are configured to receive therein rib ends of the ribs when the deployable structure is in the third stable state. The frame may function to retain the textile sheet in a pretensioned state when the deployable structure is in at least the first stable state.

Additional aspects of this disclosure are directed to methods for making and methods for using deployable structures having multiple stable state characteristics. For instance, a method is presented for assembling a multi-stable-state deployable structure. The representative method includes, in any order and in any combination with any of the above and below disclosed features and options: receiving a compliant, elastic substrate fabricated with a (knitted) textile sheet; and, mounting an articulating (polymeric) framework onto the textile sheet. The articulating framework and textile sheet structurally cooperate to transition from a first stable state, in which the deployable structure maintains a substantially planar shape, to a second stable state, in which the deployable structure maintains a first multidimensional topography, and from the second stable state to a third stable state, in which the deployable structure maintains a second multidimensional topography that is distinct from the first multidimensional topography. The framework may be mounted onto the textile sheet using any suitable fabrication process, including printing, laminating, adhering, depositing, and/or curing.

Other aspects of the present disclosure are directed to vehicle components and motor vehicles equipped with any such vehicle components having multiple stable state characteristics provided by a polymeric exoskeleton attached to a textile-based compliant and elastic substrate. As used herein, the term "motor vehicle" may include any relevant vehicle platform, such as passenger vehicles (internal combustion engine, hybrid electric, full electric, fuel cell, fuel cell hybrid, fully or partially autonomous, etc.), commercial vehicles, industrial vehicles, tracked vehicles, off-road and all-terrain vehicles (ATV), farm equipment, watercraft, aircraft, etc. It is envisioned that any of the disclosed multi-stable-state deployable structures may be utilized for both automotive and non-automotive applications.

The above summary is not intended to represent every embodiment or every aspect of the present disclosure. Rather, the foregoing summary merely provides an exemplification of some of the novel concepts and features set forth herein. The above features and advantages, and other features and advantages, will be readily apparent from the following detailed description of illustrated embodiments and representative modes for carrying out the disclosure when taken in connection with the accompanying drawings and appended claims. Moreover, this disclosure expressly includes any and all combinations and subcombinations of the elements and features presented above and below.

Figure 1:
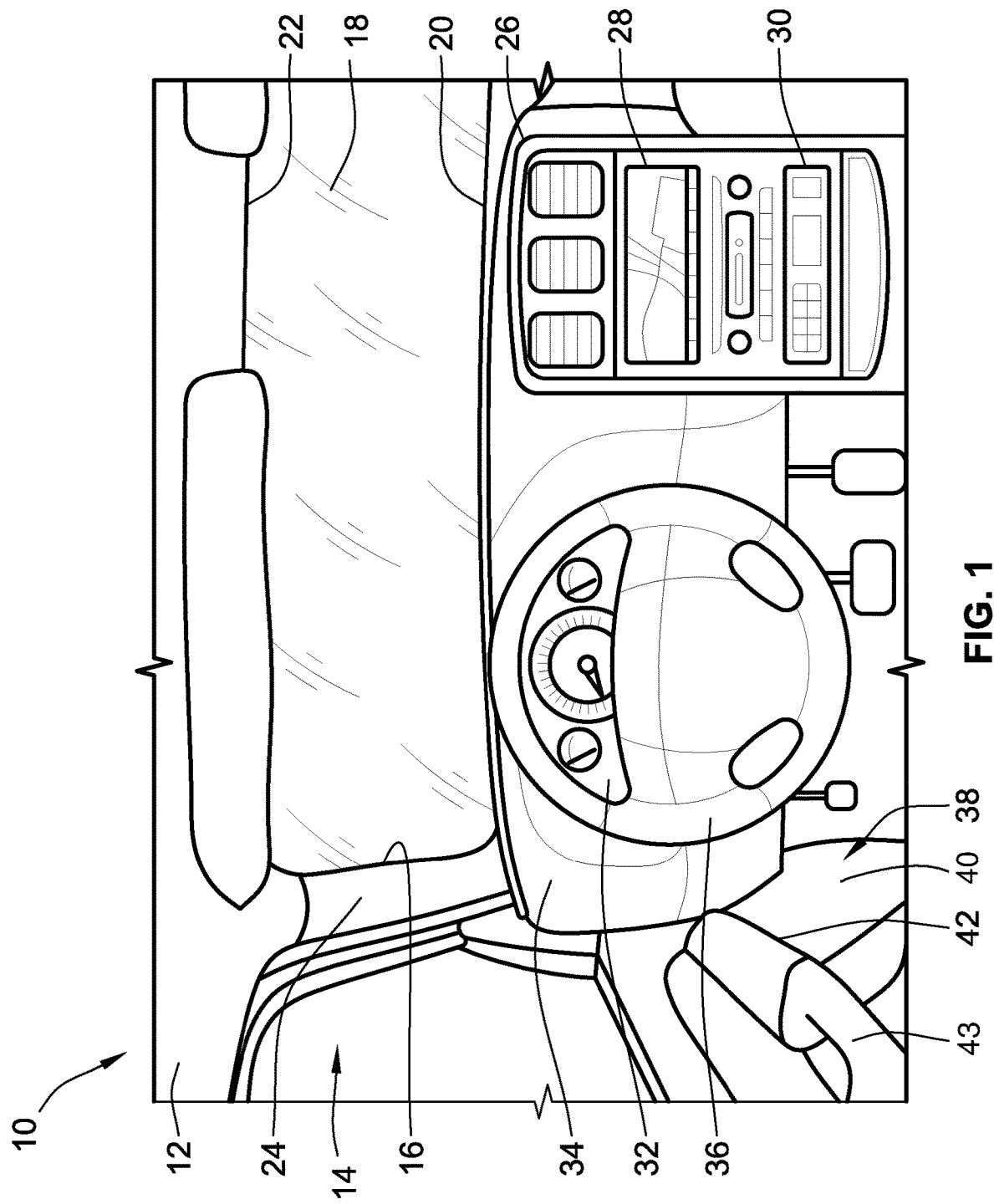
FIG. 1 is a forward-facing, perspective-view illustration of a portion of a representative vehicle passenger compartment presenting various vehicle components that may be fabricated, in whole or in part, from a deployable textile structure with multi-stable-state characteristics in accordance with aspects of the present disclosure.

The present disclosure is amenable to various modifications and alternative forms, and some representative embodiments have been shown by way of example in the drawings and will be described in detail herein. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as defined by the appended claims.

DETAILED DESCRIPTION

This disclosure is susceptible of embodiment in many different forms. There are shown in the drawings and will herein be described in detail representative embodiments of the disclosure with the understanding that these illustrated examples are provided as an exemplification of the disclosed principles, not limitations of the broad aspects of the disclosure. To that extent, elements and limitations that are described, for example, in the Abstract, Introduction, Summary, and Detailed Description sections, but not explicitly set forth in the claims, should not be incorporated into the claims, singly or collectively, by implication, inference or otherwise.

For purposes of the present detailed description, unless specifically disclaimed: the singular includes the plural and vice versa; the words "and" and "or" shall be both conjunctive and disjunctive; the word "all" means "any and all"; the word "any" means "any and all"; and the words "including" and "comprising" and "having" mean "including without limitation." Moreover, words of approximation, such as "about," "almost," "substantially," "approximately," and the like, may be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, namely a forward driving direction of a motor vehicle when the vehicle is operatively oriented on a normal driving surface, for example.

Referring now to the drawings, wherein like reference numbers refer to like features throughout the several views, there is shown in FIG. 1 a perspective-view illustration of a representative automobile, which is designated generally at 10 and portrayed herein for purposes of discussion as a passenger-type sport utility vehicle (SUV). Mounted on the vehicle body 12 of the automobile 10, e.g., to a roof rail, chassis cross-member, front cowl, rear deck, etc., within a passenger compartment 14, is an assortment of representative vehicle components that may be fabricated, in whole or in part, from a deployable textile structure with multiple-stable-state characteristics. The illustrated automobile 10—also referred to herein as "motor vehicle" or "vehicle" for short—is merely an exemplary application with which novel aspects and features of this disclosure may be practiced. In the same vein, implementation of the present concepts into the vehicle components presented in FIG. 1 should also be appreciated as an exemplary application of the novel concepts disclosed herein. As such, it will be understood that aspects and features of the present disclosure may be applied to other vehicle components, utilized for any logically relevant type of motor vehicle, and implemented for both automotive and non-automotive applications alike. Lastly, the drawings presented herein are not necessarily to scale and are provided purely for instructional purposes. Thus, the specific and relative dimensions shown in the drawings are not to be construed as limiting.

In accord with the illustrated example, a front windshield 18 is sealingly fastened, e.g., via a bonding agent and a window gasket or polymeric weather stripping (not shown), within a front window frame 16. A lower edge of the front window frame 16 is delineated by a dash panel cowl fascia 20, whereas an upper edge is delineated by a roof reinforcement panel 22, and the two lateral edges are demarcated by a pair of A-pillar trim covers 24 (only one of which is visible; a second mirrored counterpart is located on the opposite side of the window frame 16). Also present within the vehicle passenger compartment 14 is a center stack console 26 that is equipped with, among other things, a touchscreen video display 28 and a button panel 30. Touchscreen video display 28 and button panel 30 are individually operable to receive user inputs, whereas the video display 28 outputs image, text, and video-based content. A digital instrument panel (IP) 32, which is housed within a front dashboard 34 forward of a steering wheel 36, displays gauges, instrumentation, and controls for monitoring and regulating selected operations of the vehicle 10. A driver-side door assembly 38 is shown pivotably mounted, e.g., via a multi-stage check-spring door hinge, to the vehicle body 12 to provide access to and securely close a portion of the passenger compartment 14. Mounted along an inboard-facing (inside) surface of a door inner fascia panel 40 is a handle chassis 42 that provides subjacent support for operation of a door handle 43.

Figure 2:
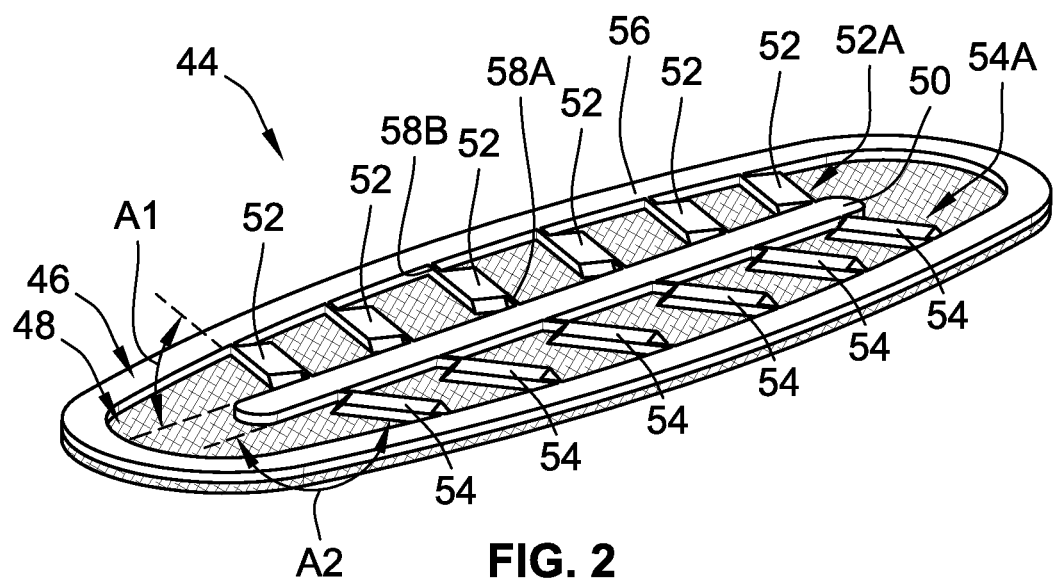
FIG. 2 is a perspective-view illustration of a representative multi-stable-state deployable textile structure shown in a first stable state in accordance with aspects of the present disclosure.
Figure 3:
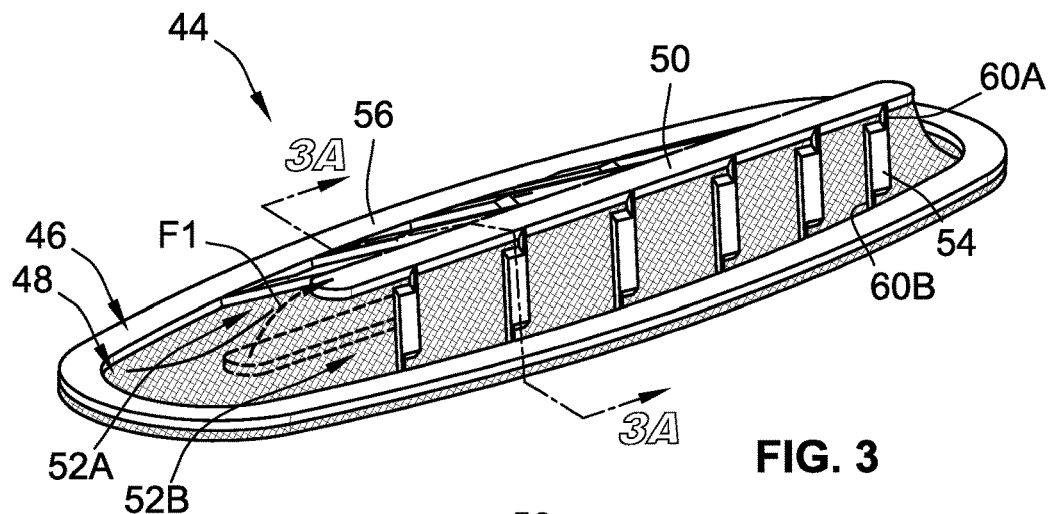
FIG. 3 is a perspective-view illustration of the representative deployable textile structure of FIG. 2 transitioned from the first stable state to a second stable state.
Figure 4:
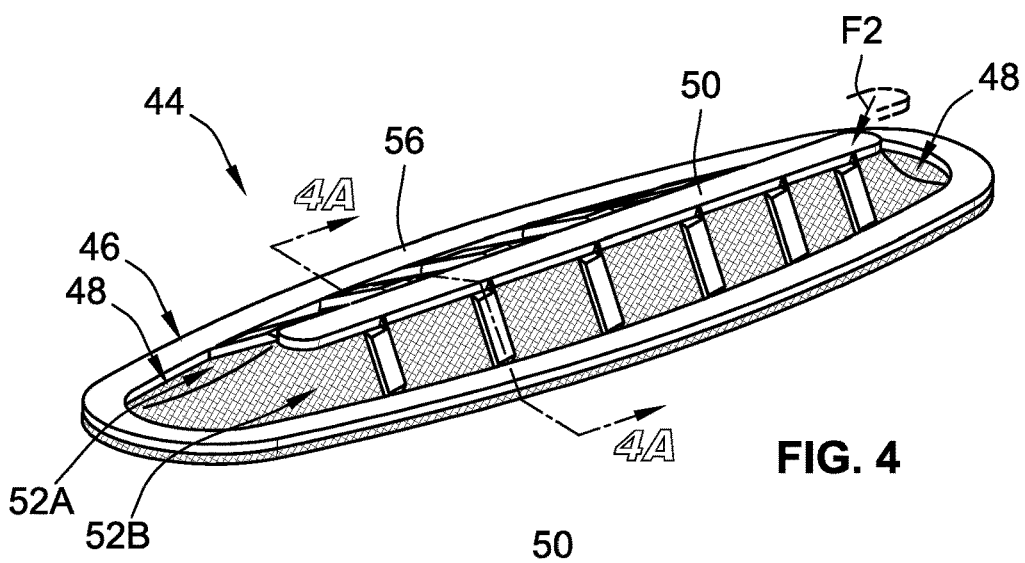
FIG. 4 is a perspective-view illustration of the representative deployable textile structure of FIG. 3 transitioned from the second stable state to a third stable state.

Many of the above-described vehicle components, including the cowl fascia 20, roof reinforcement panel 22, pillar trim covers 24, trim portions of the center stack console 26 and dashboard 34, and the door fascia panel 40, may be manufactured from a textile assembly designed to maintain multiple stable states. An example of a multi-stable-state deployable textile structure is illustrated in FIGS. 2-4, designated generally at 44. The term "textile", as used herein, may refer to a fabric or cloth that is formed from natural or synthetic fibers by knitting, weaving, crocheting, braiding, bonding, lacing, or any other suitable process for textile production. A textile material may be composed of one or more of organic fibers, such as animal-based and plant-based fibers, one or more synthetic fibers, such as polymer-based and glass-based fibers, and/or one or more metal-based fibers, such as silver, gold, or aluminum filaments and aluminized yarns. Textile materials made using a combination of these methods and/or materials could have portions that incorporate multiple structures, for example: a knitted portion formed using braided fibers; fibers woven through a knitted or crocheted structure, e.g., to provide dimensional strength and/or stabilization; a crocheted edge formed on a knitted or woven structure; woven layers knitted together to form a multi-layer textile material such as a 3D textile material, etc. Some textile materials include more than one type of fiber, including one or more organic fibers, synthetic fibers, and metal-based fibers, as well as a blended fiber, such as an animal/synthetic blended fiber, an animal/plant blended fiber, a plant/synthetic blended fiber, a glass/polymer blended fiber (fiberglass), a metal/polymer blended fiber, etc., and any combination thereof.

Natural fibers are any fibers that are produced by or from plants, animals, and geological processes. Animal fiber may include fibers produced from the hair and/or fur of an animal providing hair/fur suitable for fiber production, as well as silk fibers produced from insect cocoons, and the like. Plant-based fiber, by comparison, may include fiber produced from any plant providing a plant material which is suitable for fiber production, including cotton, flax, wood (acetate, rayon), bamboo, jute, hemp, etc., as some non-limiting examples. In contrast, synthetic fibers are generally made from synthesized polymers, and may include fibers made of one or more of acrylic, KEVLAR®, nylon, nomex, polyester, spandex, and the like. Synthetic fiber may be formed, by way of non-limiting example, by spinning, extrusion, drawing, and the like. A textile material may be formed of a yarn including a plurality of fibers which have been spun or twisted together or otherwise interlocked or joined to form a yarn. The textile material may include monofilament fiber, polyfilament fiber, staple fiber, or a combination of these.

Turning to FIG. 2, the deployable textile structure 44 (also referred to herein as "deployable structure") is shown as a two-part, bi-material construction generally composed of an elastic and compliant textile substrate 46 with an articulating framework 48 that is mounted on at least one major surface of the substrate 46. According to the representative architecture illustrated in FIGS. 2-4, the flexible textile substrate 46 (also referred to herein as "textile substrate" or merely "substrate" for purposes of brevity) may generally consist of a substantially flat, single-piece knitted sheet. Optionally, the textile substrate 46 may be formed as a multi-dimensional and/or multi-layer material, taking on any desired shape and size for an intended application. Textile substrate 46 of FIG. 2 may be formed using a single technique or a combination of techniques. For instance, the textile substrate 46 may be a knitted 3D material into which weft and/or warp threads are woven to provide for directional properties, such as directional stretchability, pretension, predetermined distortion of spaces in the textile structure under load, damping characteristics, etc. For multi-layer constructions, the textile substrate 46 may include interconnected layers formed by a single technique, such as a double-layer weave composition, or include at least one of multiple layers formed by a different technique than at least one of the other layers. It is envisioned that the textile substrate 46 may be formed by weaving, knitting, crocheting, braiding, and the like, e.g., such that fibers are spaced from one another and may move relative to one another, for example, under load, such that fiber spacing and orientation may change dimension, shape, and orientation in response to a change in the direction and magnitude of a load being imposed on the textile substrate 46.

Continuing with the above example, the textile substrate 46 may be characterized as one or more of elastic, stretchable, porous, and bendable and, optionally, capable of providing a desired response, including one or more of a stiffness response, an energy dissipation response, a shape-shifting response, and a thermal response. Textile substrate 46 may be fabricated with a hydrophobic, hydrophilic, wicking, or porous configuration, e.g., provided by predetermined spacing between fibers forming the textile, to provide for fluid flow (heat, air, and vapor including water vapor) into and/or through the textile material. The rate and capacity of the fluid flow and diffusivity of the textile material may change as an applied load is varied. Response characteristics of the textile substrate 46 may be varied by modifying a stitch type, a stitch pattern, a yarn type, a yarn denier, a needle size, a fiber type, a fiber size, a stitch density, a warp pattern, a weft pattern, a weave type, a braiding pattern, etc., of the textile material. These features of the textile material may help to determine characteristics of the textile substrate 46, including density, thickness, porosity, conductivity, elasticity, etc., of the textile material, and the shape, size and orientation and dynamic response of spaces defined between the fibers in the textile material.

With continuing reference to FIGS. 2-4, the articulating framework 48 may be made of a polymeric material, such as a laminated or printed polymer, or a metallic material, such as a plated or deposited metal. Materials that may be used in forming the framework 48 include steel, aluminum, nickel, copper, gold, and alloys thereof, as well as polycarbonates, polypropylenes, polyethers, polyethylene terephthalate (PET), polyvinyl chloride (PVC), or combinations thereof. In a first non-limiting example, vacuum deposition, ion plating, or electro/electroless plating of aluminum or nickel may be implemented to generate the articulating framework 48 on a top-most major surface of the textile substrate 46. As per a second non-limiting example, 3D printing or laminating of aromatic or aliphatic polyether or polyester polyurethanes may be implemented to generate the articulating framework 48 on a top-most major surface of the textile substrate 46. To improve adhesion or cohesion, the interfacing surface of the textile substrate 46 may be coated, for example, with a binder or binding agent, such as polyurethane binder, poly-acrylate binder or styrene-butadiene latex. While shown applied to only one side/surface of the textile substrate 46, it is clearly within the scope of this disclosure to incorporate the articulating framework 48 or select features of the framework 48 to multiple sides/surfaces of the textile substrate 46.

According to the representative architecture of FIG. 2, the articulating framework 48 is formed with an elongated, substantially straight spine 50 that is sandwiched or otherwise interposed between a first rib 52 or first series/plurality of ribs 52A and a second rib 54 or second series/plurality of ribs 54A. As shown, the first plurality of ribs 52A is disposed on a first lateral side of the elongated spine 50 (a left-hand side in FIG. 2), with the individual ribs 52 oriented generally parallel to and spaced equidistantly from one another along the length of the spine 50. In the same vein, the second plurality of ribs 54A is shown positioned on a second lateral side of the elongated spine 50 (a right-hand side in FIG. 2), with the individual ribs 54 oriented generally parallel to and spaced equidistantly from one another along the length of the spine 50. When resting in the stable state portrayed in FIG. 2, each first rib 52 projects transversely from the first lateral side of the elongated spine 50 at a first oblique angle A1, while each second rib 54 projects transversely from the second lateral side of the elongated spine 50 at a second oblique angle A2. While not per se required, the first oblique angle A1 may be approximately equal to the second oblique angle A2. Alternative applications may necessitate the oblique angles A1, A2 be different from each other or, if so desired, one or more of the ribs 52, 54 may take on a distinct angle of projection with respect to the spine 50. It should be appreciated that the number, orientation, shape, and location of the ribs 52, 54 may be varied from that which are shown in the drawings. For instance, it is envisioned that each series of ribs 52A, 52B may include greater or fewer than six ribs. Moreover, while shown as parallelograms with beveled distal ends, the ribs 52, 54 may take on other shapes and features to achieve the disclosed functionality.

Articulating framework 48 of FIG. 2 is also provided with a rigid frame 56 that partially or completely surrounds the elongated spine 50 and the two series of ribs 52A, 54A. As shown, the frame 56 is an oval-shaped, oblong structure that extends substantially continuously along an outer perimeter of the textile substrate 46, circumscribing the elongated spine 50 and ribs 52, 54. As a continuous structure, the frame 56 may function to help retain the knitted textile sheet of the substrate 46 in a pretensioned state, e.g., when the deployable structure 44 is resting in the stable state portrayed in FIG. 2. Each rib 52, 54 in the first and second series of ribs 52A, 54A may be mechanically attached directly to the frame 56 and elongated spine 50, e.g., by a respective pair of bendable "living" hinges. By way of example, FIG. 2 illustrates an integrally formed inboard living hinge 58A interposed between and connecting the rib 52 and spine 50, and an integrally formed outboard living hinge 58B interposed between and connecting the rib 52 and frame 56. Also by way of example, FIG. 3 illustrates an integrally formed inboard living hinge 60A interposed between and connecting the rib 54 and spine 50, and an integrally formed outboard living hinge 60B interposed between and connecting the rib 54 and frame 56. With this architecture, the articulating framework 48—the spine 50, ribs 52, 54, frame 56, and hinges 58A-B, 60A-B—may be formed as a single-piece, unitary structure. Alternatively, one or more or all of the ribs 52, 54 may be spaced from and may lack a direct mechanical coupling to the spine 50 and/or frame 56. Similar to the spine 50 and ribs 52, 54, the shape, size and/or orientation of the frame 56 may be scaled to a particular application or adapted for a desired functionality.

The deployable textile structure 44 of FIGS. 2-4 is designed to maintain at least two or, for some configurations, three or more stable states, e.g., to provide more efficient, agile fabrication, shipping, and assembly of any one of the vehicle components discussed above. In mechanical engineering, a transient state may be typified as a dynamic response of a mechanical system to an applied force, which causes a change from one stable-state equilibrium to another stable-state equilibrium. As used herein, the term "stable state" may be defined to include a steady state condition of a dynamic mechanical system that the system may maintain without application of an external force or introduction of an outside source of energy. In this regard, the deployable textile structure 44 is structurally configured to maintain each of the stable states illustrated in FIGS. 2, 3 and 4 without requiring a continued application of an external force.

Figure 3A:
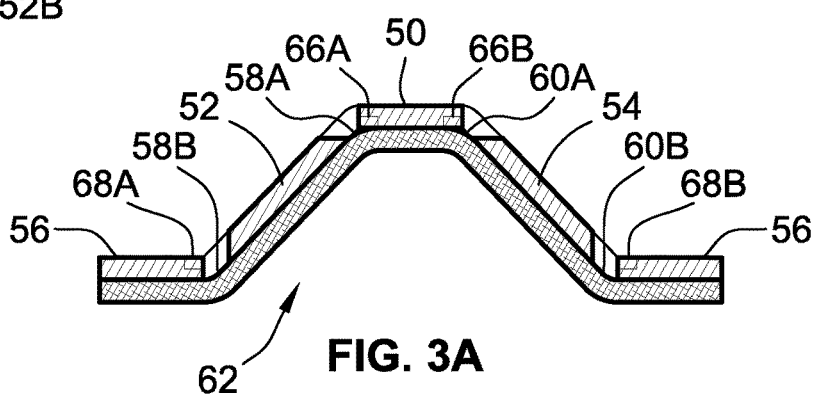
FIG. 3A is a transverse cross-sectional illustration of the deployable textile structure of FIG. 3 taken along line 3A-3A.

According to the representative architecture illustrated in the drawings, the flexible textile substrate 46 and articulating framework 48 are cooperatively configured to transition between three stable states: a first stable (or semi-stable) state illustrated in FIG. 2; a second stable state illustrated in FIG. 3; and a third stable state illustrated in FIG. 4. When in the first stable state, which is best seen in FIG. 2, the deployable structure 44 maintains a substantially flat and planar shape, e.g., for ease of stacking, packaging and shipping. Absent the application of an external stimulus, the flexible textile substrate 46 and articulating framework 48 will retain the deployable textile structure 44 in this state for a continuous, if not indefinite period of time. Comparatively, a manual or automated external force F1 (e.g., a rotational force in a clockwise direction in FIG. 3) may be applied to the elongated spine 50 to transition the deployable textile structure 44 from the first stable state of FIG. 2 to the second stable state shown in FIGS. 3 and 3A. The elastic nature of the textile substrate 46, which is attempting to draw the elongated spine 50 back to its original position (e.g., in a counterclockwise direction in FIG. 3), is counterbalanced or otherwise offset by the angled orientation of the ribs 52, 54 with respect to the spine 50 and frame 56. In so doing, the flexible textile substrate 46 and articulating framework 48 will retain the deployable textile structure 44 in this second steady state for a continuous, if not indefinite period of time, until another stimulus is applied. When in the second stable state, the deployable structure 44 maintains a first multidimensional topography, which is represented in FIG. 3A by the width, height and/or arc length of the first protruding dome 62.

Figure 4A:
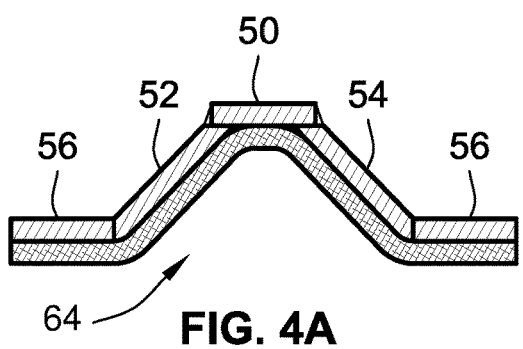
FIG. 4A is a transverse cross-sectional illustration of the deployable textile structure of FIG. 4 taken along line 4A-4A.

A second manual or automated external force F2 (e.g., a generally linear force in a downward and leftward direction in FIG. 3) may be applied to the elongated spine 50 to transition the deployable textile structure 44 from the second stable state of FIG. 3 to the third stable state, which is best seen in FIGS. 4 and 4A. Once again, the elastic nature of the textile substrate 46 is attempting to draw the elongated spine 50 back to the original position illustrated in FIG. 2. However, this return motion is prevented by trapping and/or squeezing the ribs 52, 54 between the spine 50 and frame 56, which will be described in further detail below. When in the third stable state, the deployable structure 44 maintains a second multidimensional topography, which is represented herein by the width, height and/or arc length of a second protruding dome 64 portrayed in FIG. 4A. By comparing FIGS. 3A and 4A, it can be seen that the height and arc length and, thus, the topography of the first protruding dome 62 is distinct from the height and arc length and, thus, the topography of the second protruding dome 64. In effect, the first multidimensional topography 62 has a first transverse cross-sectional geometry (FIG. 3A) that is distinct from a second transverse cross-sectional geometry (FIG. 4A) of the second multidimensional topography 64.

With collective reference to FIGS. 2 and 3, the first and second pluralities of ribs 52A, 52B are spaced from the elongated spine 50 and the frame 56 when the deployable structure 44 is in the first and second stable states. This spaced relationship between the ribs 52, 52 and spine/frame 50, 56 may be maintained, in whole or in part, via the flexible textile substrate 46 in cooperation with the living hinges 58, 60. However, application of the second force F2 to the spine 50 will rotate and collapse the hinges 58, 60 and concomitantly press the opposing distal ends of each rib 52, 54 against the elongated spine 50 and frame 56. The abutting relation between the spine 50, ribs 52, 54, and frame 56 help to retain the deployable structure 44 in the third stable state. For at least some optional configurations, the elongated spine 50 may be fabricated with first and second sets of grooves 66A and 66B, respectively (FIG. 3A); each groove 66A, 66B is configured to receive therein a first (upper) rib end of one rib 52, 54 when the deployable structure 44 is in the third stable state (FIG. 4). Likewise, the frame 56 may include optional first and second sets of notches 68A and 68B, respectively (FIG. 3A); each notch 68A, 68B is configured to receive therein a second (lower) rib end of one rib 52, 54 when the deployable structure 44 is transitioned to the third stable state.

The representative deployable structure 44 of FIGS. 2-4 is shown transitioning along a generally arcuate path when moving from the first stable state (FIG. 2) to the second stable state (FIG. 3), and then transitioning along a generally linear path when moving from the second stable state (FIG. 3) to the third stable state (FIG. 4). The deployable structure 44 may follow alternative paths when transitioning between any of the herein described stable states without departing from the scope and spirit of this disclosure. For instance, a first segment of the flexible textile substrate 46 (e.g., the left half in FIG. 2) and any segments of the articulating framework 48 mounted thereon may be folded over onto a second segment of the flexible textile substrate 46 (e.g., the right half in FIG. 2) when the deployable structure 44 is in the first stable state. These two segments of the flexible textile substrate 46 may be configured to unfold when the deployable structure 44 transitions to the second and/or the third stable state.

For at least some embodiments, the flexible textile substrate 46 includes a yarn with a glass transition temperature and/or a polymer melting point that is higher than a melting temperature of a polymeric material used to fabricate the articulating framework 48. For natural fibers, it may be desirable that a flash point temperature and/or a singing point temperature of the natural fiber be about equal to a melting temperature of the framework material. For at least some embodiments, bonding through adhesion, fiber infiltration into the yarn structure, and/or yarn encapsulation may be used to connect the framework 48 to the substrate 46. As another potential option, each loop of the flexible textile substrate 46 may be knit with multiple yarns, at least one of which has a flash point/singing temperature that is above the processing temp of the framework 48, and at least one of which has a flash point/singing temperature that is below the processing temp of the framework 48. In so doing, at least some of the fiber material will melt or soften, which will potentially better adhere to the skeletal framework (e.g., using a "fusible yarn"). For the skeletal framework 48, it may be desirable to use a thermoplastic polymer; however, if adhesives or epoxies are used, most metallic, thermoset plastics, composite materials, etc., may be used for the framework 48.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and obvious variations apparent from the foregoing descriptions are within the scope of the disclosure as defined by the appended claims. Moreover, the present concepts expressly include any and all combinations and subcombinations of the preceding elements and features.

What is claimed:

1. A deployable structure with multiple stable states, the deployable structure comprising:
an elastic substrate including a textile sheet; and
an articulating framework mounted on the textile sheet, wherein the articulating framework and the textile sheet are cooperatively configured to transition between: a first stable state in which the deployable structure maintains a substantially planar shape; a second stable state in which the deployable structure maintains a first multidimensional topography; and a third stable state in which the deployable structure maintains a second multidimensional topography distinct from the first multidimensional topography.

2. The deployable structure of claim 1, wherein the articulating framework includes an elongated spine sandwiched between first and second ribs.

3. The deployable structure of claim 2, wherein the first rib projects from a first lateral side of the elongated spine at a first oblique angle, and the second rib projects from a second lateral side of the elongated spine at a second oblique angle.

4. The deployable structure of claim 3, wherein the first oblique angle is approximately equal to the second oblique angle.

5. The deployable structure of claim 2, wherein the first rib includes a first plurality of ribs disposed on a first lateral side of the elongated spine, and the second rib includes a second plurality of ribs disposed on a second lateral side of the elongated spine.

6. The deployable structure of claim 5, wherein the first plurality of ribs is attached to the elongated spine by a first set of living hinges, and the second plurality of ribs is attached to the elongated spine by a second set of living hinges.

7. The deployable structure of claim 5, wherein the first and second pluralities of ribs are spaced from the elongated spine when the deployable structure is in the first stable state, and abut the elongated spine when the deployable structure is in the third stable state.

8. The deployable structure of claim 7, wherein the spine includes first and second sets of grooves configured to receive therein rib ends of the first and second pluralities of ribs, respectively, when the deployable structure is in the third stable state.

9. The deployable structure of claim 5, wherein the articulating framework further includes a frame at least partially surrounding the elongated spine and the first and second ribs.

10. The deployable structure of claim 9, wherein the textile sheet includes an outer perimeter, and wherein the frame extends continuously along the outer perimeter of the textile sheet and circumscribes the elongated spine and the first and second ribs.

11. The deployable structure of claim 9, wherein the first and second pluralities of ribs are spaced from the frame when the deployable structure is in the first stable state, and abut the frame when the deployable structure is in the third stable state.

12. The deployable structure of claim 11, wherein the frame includes first and second sets of notches configured to receive therein rib ends of the first and second pluralities of ribs, respectively, when the deployable structure is in the third stable state.

13. The deployable structure of claim 9, wherein the textile sheet is retained in a pretensioned state via the frame of the articulating framework when the deployable structure is in the first stable state.

14. The deployable structure of claim 1, wherein the first multidimensional topography has a first transverse cross-sectional geometry, and the second multidimensional topography has a second transverse cross-sectional geometry distinct from the first transverse cross-sectional geometry.

15. The deployable structure of claim 1, wherein first and second segments of the elastic substrate are folded over onto each other when the deployable structure is in the first stable state, and wherein the first and second segments of the elastic substrate are configured to unfold when the deployable structure transitions to the third stable state.

16. A method of assembling a deployable structure with multiple stable states, the method comprising:
receiving an elastic substrate including a textile sheet; and
mounting an articulating framework onto the textile sheet, wherein the articulating framework and the textile sheet are cooperatively configured to transition between: a first stable state in which the deployable structure maintains a substantially planar shape; a second stable state in which the deployable structure maintains a first multidimensional topography; and a third stable state in which the deployable structure maintains a second multidimensional topography distinct from the first multidimensional topography.

17. The method of claim 16, wherein the articulating framework includes an elongated spine, a first plurality of ribs disposed on a first lateral side of the elongated spine, and a second plurality of ribs disposed on a second lateral side of the elongated spine.

18. The method of claim 17, wherein the first plurality of ribs projects from the first lateral side of the elongated spine at a first oblique angle, and the second plurality of ribs projects from a second lateral side of the elongated spine at a second oblique angle.

19. The method of claim 18, wherein the first and second pluralities of ribs are: spaced from the elongated spine when the deployable structure is in the first stable state; and abut the elongated spine when the deployable structure is in the third stable state.

20. The method of claim 16, wherein mounting the articulating framework onto the textile sheet includes printing, laminating, adhering, depositing, and/or curing.

* * * * *